US011420520B2

(12) United States Patent
Pastushenko

(10) Patent No.: US 11,420,520 B2
(45) Date of Patent: Aug. 23, 2022

(54) DECORATIVE COMPONENT

(71) Applicant: Dr. Ing. h.c. F. Porsche Aktiengesellschaft, Stuttgart (DE)

(72) Inventor: Alexandra Pastushenko, Esslingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 118 days.

(21) Appl. No.: 17/078,106

(22) Filed: Oct. 23, 2020

(65) Prior Publication Data

US 2021/0122243 A1 Apr. 29, 2021

(30) Foreign Application Priority Data

Oct. 28, 2019 (DE) ...................... 10 2019 128 994.7

(51) Int. Cl.
*B60K 35/00* (2006.01)
*B60K 37/02* (2006.01)
*G09F 19/02* (2006.01)

(52) U.S. Cl.
CPC .............. *B60K 35/00* (2013.01); *B60K 37/02* (2013.01); *G09F 19/02* (2013.01)

(58) Field of Classification Search
CPC ............................. B60K 35/00; B60K 37/02; B60K 2370/1438; B60K 2370/1523; B60K 2370/693; B60K 37/06; G09F 19/02; B60R 2013/0281; B60R 13/02
See application file for complete search history.

(56) References Cited

U.S. PATENT DOCUMENTS

| 10,638,618 | B1* | 4/2020 | Teil ...................... H03K 17/962 |
| 2003/0175467 | A1 | 9/2003 | Campbell et al. |
| 2014/0308469 | A1 | 10/2014 | Aida et al. |
| 2017/0361797 | A1 | 12/2017 | Weindorf et al. |
| 2019/0001637 | A1 | 1/2019 | Ito et al. |
| 2019/0240884 | A1 | 8/2019 | Nakagawa et al. |
| 2020/0210003 | A1* | 7/2020 | Hong ...................... G06F 3/016 |

FOREIGN PATENT DOCUMENTS

| DE | 102016121097 B3 | 5/2018 |
| EP | 2065258 A1 | 6/2009 |
| WO | WO 2010129732 A1 | 11/2010 |

* cited by examiner

*Primary Examiner* — Omeed Alizada
(74) *Attorney, Agent, or Firm* — Leydig, Voit & Mayer, Ltd.

(57) ABSTRACT

A decorative component for an interior space of a motor vehicle includes a display panel configured to cover a display element and/or constituting a display element. The decorative component further includes a decorative element, adjoining the display panel, configured to provide a visually and haptically perceptible decorative surface. The haptic and/or visual perception of the decorative surface is different than the haptic and/or visual perception of a panel surface of the display panel. The display panel overlaps the decorative element in an overlapping region and a material thickness of the display panel is designed such that it becomes monotonously thinner toward the decorative element in the overlapping region.

10 Claims, 1 Drawing Sheet

DECORATIVE COMPONENT

CROSS REFERENCE TO RELATED APPLICATIONS

This application claims benefit to German Patent Application No. DE 10 2019 128 994.7, filed on Oct. 28, 2019, the entire disclosure of which is hereby incorporated by reference herein.

FIELD

The invention relates to a decorative component for an interior space of a motor vehicle, by which the interior space can be visually designed.

BACKGROUND

EP 2 065 258 A1 discloses a decorative component in which a first insert produced from glass and a second insert produced from wood lie against one another in abutting fashion and are underpinned by a common substrate.

There is a constant need to connect different materials harmoniously to one another in an interior space of a motor vehicle.

SUMMARY

In an embodiment, the present invention provides a decorative component for an interior space of a motor vehicle. The decorative component includes a display panel configured to cover a display element and/or constituting a display element. The decorative component further includes a decorative element, adjoining the display panel, configured to provide a visually and haptically perceptible decorative surface. The haptic and/or visual perception of the decorative surface is different than the haptic and/or visual perception of a panel surface of the display panel. The display panel overlaps the decorative element in an overlapping region and a material thickness of the display panel is designed such that it becomes monotonously thinner toward the decorative element in the overlapping region.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
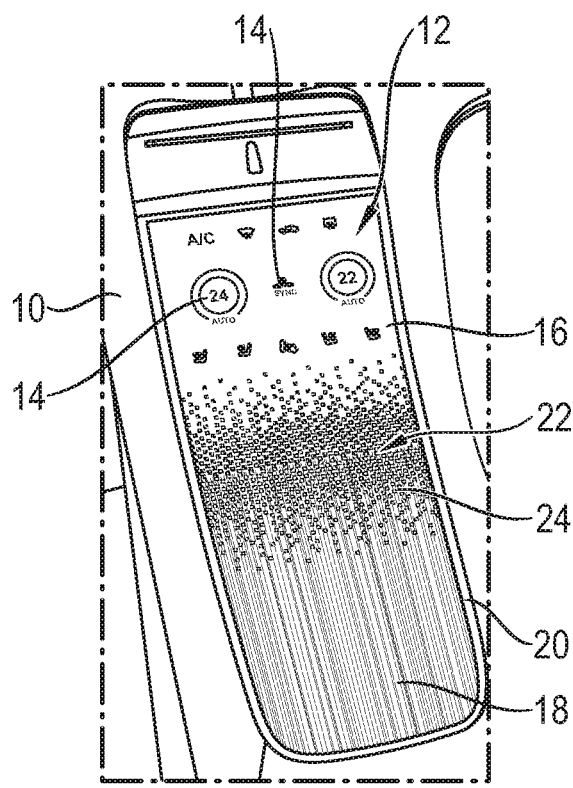
FIG. 1 shows a schematic perspective view of an installed decorative component.

The present disclosure describes measures which make a harmonious connection of different materials in an interior space of a motor vehicle possible.

According to the disclosure, a decorative component for an interior space of a motor vehicle is provided, having a display panel for covering and/or constituting a display element and a decorative element, adjoining the display panel, for providing a visually and haptically perceptible decorative surface, wherein the haptic and/or visual perception of the decorative surface is different than the haptic and/or visual perception of a panel surface of the display panel, wherein the display panel overlaps the decorative element in an overlapping region and a material thickness of the display panel is designed such that it becomes monotonously thinner toward the decorative element in the overlapping region.

The display panel, which in particular is produced from glass, may for example cover the display element provided beneath it. As an alternative to glass, the display panel may also consist of another transparent material, such as for example plastic. Here, the display panel has a hard and smooth panel surface which is perceived as rather cold. Materials perceived as particularly pleasant for the interior space of the motor vehicle, however, are wood-based materials, for example genuine wood veneer, which may be perceived as rather warm and structured. In order on the one hand to be able to constitute electronic display elements and on the other hand to provide an interior which is perceived as pleasant, it may thus be found that, in the interior space of the motor vehicle, the display panel has to be positioned in immediate proximity to the decorative element which is produced in particular from a wood-based material. Since the display panel and the decorative element are not arranged next to one another via an abutting join but rather merge gradually into one another via an overlapping region, a harmonious connection can be achieved. In the overlapping region, the surface of the in particular opaque decorative element can show through at least in a thickness region of the in particular at least translucent display panel that becomes thinner. As a result, a haptic, but if at all only a very small visual, change in perception is produced at that end of the overlapping region which faces toward the decorative element. If at all, a visual but not a haptic change in perception may be produced at that end of the overlapping region which faces away from the decorative element. The surface of the decorative element may scarcely show through the display panel at all at that end of the overlapping region which faces away from the decorative element, for example on account of the achieved material thickness of the only partially transparent material of the display panel, with the result that the change in material between the decorative element and the display panel is visually scarcely perceptible. The monotonously changing material thickness of the display panel in the overlapping region makes it possible to avoid a simultaneous hard change in haptic and visual perception, as a result of which a harmonious connection of different materials in an interior space of a motor vehicle is made possible.

In the transition region, the display panel may have for example a cross section viewed transversely to the longitudinal extent that corresponds to a right-angled triangle, which has a very sharp tip at that end of the overlapping region which faces the decorative element. The extent of the display panel may have a much greater maximum material thickness at that end of the overlapping region which faces away from the decorative element. For example, the extent of the overlapping region in the longitudinal direction may correspond to at least 10 times, preferably at least 20 times, particularly preferably at least 30 times the maximum material thickness of the display panel in the overlapping region.

In the overlapping region, the display panel may become ever thinner toward the decorative element and finally run out flush into the surface of the decorative element. The display panel and the decorative element may form a common surface-flush surface for the decorative component. This makes it possible to harmoniously integrate a hybrid component which is produced from different materials, in particular glass and genuine wood veneer, and avoids a visually and haptically hard break between the materials and enables a softer visual and/or haptic transition which is perceived as less disruptive. An adhesion promoter, preferably an adhesive, is preferably provided between the display panel and the decorative element, in particular in the overlapping region, the adhesion promoter particularly preferably being substantially transparent.

In particular, the minimum material thickness of the display panel in the overlapping region is dimensioned such that merely mechanical damage by way of perpendicular pressure being applied to the panel surface by a human finger is avoided. The material thickness of the display panel at that end of the overlapping region which faces toward the decorative element may be selected to be particularly small as a result. The remaining minimum thickness is in any case selected such that, during regular operation, damage to the display panel at this edge is avoided and/or accidental cutting at the edge can be avoided. The remaining minimum thickness may amount to, for example, less than 1.0 mm, in particular less than 0.5 mm, preferably less than 0.1 mm, the remaining minimum thickness preferably amounting to at least 0.03 mm.

The display panel and the decorative element are preferably inserted, in particular clamped, in an installation frame. The display panel and the decorative element may be held together by the installation frame to form a common component. Particularly preferably, the installation frame has a border which projects over the display panel and the decorative element, with the result that the display panel and the decorative element cannot slide past one another on the sloping plane formed in the overlapping region, but rather can form a surface-flush common surface.

Particularly preferably, on the edge of the overlapping region, the display panel has a panel stop, formed by a jump in the material thickness, for lying areally against a corresponding decorative stop of the decorative element. The panel stop and the decorative stop may face toward one another in the longitudinal direction and in particular lie against one another. As a result, the position of the display panel relative to the decorative element can be prescribed precisely, with the result that a precise close contact of the display panel and the decorative element in the overlapping region can be ensured. A height offset and/or a join between the display panel and the decorative element at that end of the overlapping region which faces the decorative element can be avoided or at least minimized as a result.

In particular, the display panel is produced from a transparent and/or translucent material, in particular glass, wherein the display panel in the overlapping region has an average translucency which increases toward the decorative element. In the overlapping region, the visual impression of the decorative element may adapt gradually to the visual impression of the display panel, and vice versa. A visual hard break between the display panel and the decorative element can be avoided.

Preferably, the translucency of the display panel is at a maximum at that end of the overlapping region which faces toward the decorative element and/or the translucency of the display panel is at a minimum at that end of the overlapping region which faces away from the decorative element. The display panel can be completely transparent at that end of the overlapping region which faces toward the decorative element and/or completely opaque at that end of the overlapping region which faces away from the decorative element.

Particularly preferably, the display panel in the overlapping region has an opaque raster, wherein the raster has longitudinally successive rows with a monotonously changing number of raster points and/or with raster points which monotonously change in size. As a result, even in the case of a substantially transparent material for the display panel, a gradual transition from the visual appearance of the decorative element to an opaque visual appearance of the display panel in the region of the display element can be easily realized.

In particular, a longitudinal extent L of the overlapping region corresponds substantially to a longitudinal extent S of the display panel outside the overlapping region, where in particular it holds true that $L/S=1.0\pm0.2$. The overlapping region can as a result amount to a significantly large extent which enables a very harmonious visual transition between the display panel and the decorative element.

The display panel is preferably part of a touchscreen. This makes it possible to react to the information presented by the display element and to perform a manipulation with the finger. Here, an occupant of the vehicle can skim their finger over the decorative element and the overlapping region to the display element and have a pleasant visual and haptic experience.

The disclosure also provides to an interior lining part, in particular a door interior lining for a door of a motor vehicle or central console, having a top side which bounds an interior space and a decorative component that is embedded into the top side and can be formed or developed as described above. The monotonously changing material thickness of the display panel in the overlapping region makes it possible to avoid a simultaneous hard change in haptic and visual perception, as a result of which a harmonious connection of different materials in an interior space of a motor vehicle is made possible.

Figure 3:
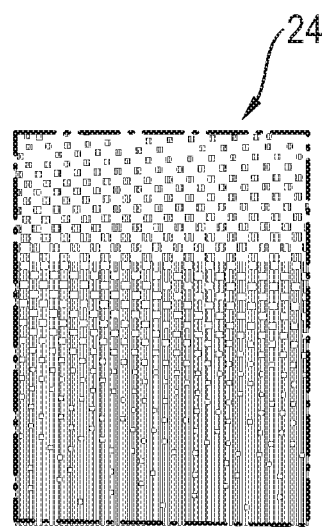
FIG. 3 shows a raster suitable for the decorative component from FIG. 1.

FIG. 1 illustrates an installed decorative component 12 using the example of a central console 10 of a motor vehicle. The decorative component 12 has a display panel 16 which covers display elements 14 and consists of glass, and a decorative element 18 which is produced from genuine wood veneer which are enclosed in an installation frame 20. In an overlapping region 22, the substantially transparent display panel 16 may cover over the decorative element 18, with the result that the decorative element 18 can show through the display panel 16. Outside the overlapping region 22, the display panel 16 is colored, for example in gray. In order to produce a uniform, visually harmonious transition between the decorative element 18 and the display panel 16, provided in the overlapping region 22 is a raster 24 which is illustrated in more detail in FIG. 3. The raster has raster points applied in the color of the display panel 16 outside the overlapping region 22, the number and/or size of which raster points become(s) greater toward that region of the display panel 16 which is arranged outside the overlapping region 22 and become(s) smaller toward that region of the decorative element 18 which is arranged outside the overlapping region 22, with the result that it is possible for a uniform color profile to be produced.

Figure 2:
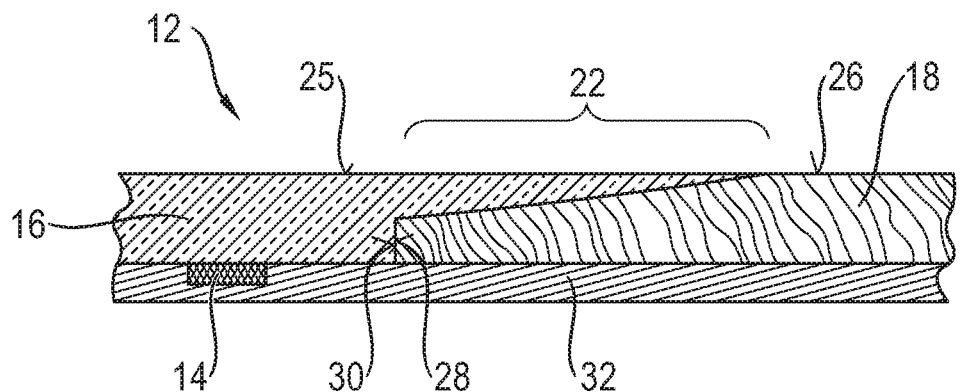
FIG. 2 shows a schematic sectional view of the decorative component from FIG. 1

As illustrated in FIG. 2, the material thickness of the display panel 16 in the overlapping region 22 becomes ever thinner toward the decorative element 18 until it merges almost seamlessly into the decorative element 18. A panel surface 25 of the display panel 16 and a decorative surface 26 of the decorative element 18 form a common surface-flush surface of the decorative component 12. In the overlapping region, the material of the display panel 16 may form a very sharp right-angled triangle as the cross-sectional surface viewed transversely to the longitudinal extent. Preferably, the display panel 16 has a step on that edge of the overlapping region 22 which faces away from the decorative element 18, as a result of which the display panel 16 forms a panel stop 28 against which a corresponding decorative stop 30 of the decorative element 18 can butt in the longitudinal direction. As a result, the position of the decorative element 18 relative to the display panel 16 can be prescribed in a defined manner, without it being possible for a sliding-off to occur over the sloping plane formed in the overlapping region 22. The display panel 16 and the decorative element 18 may be placed on their common bottom side or only part of their bottom side on a substrate 32 and preferably for example be fastened to the substrate 32 by clamping or adhesive bonding. The substrate 32 may in particular be part of the installation frame 20.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A decorative component for an interior space of a motor vehicle, comprising:
    a display panel configured to cover a display element and/or constituting a display element, and
    a decorative element, adjoining the display panel, configured to provide a visually and haptically perceptible decorative surface,
    wherein the haptic and/or visual perception of the decorative surface is different than the haptic and/or visual perception of a panel surface of the display panel, and
    wherein the display panel overlaps the decorative element in an overlapping region and a material thickness of the display panel is designed such that it becomes monotonously thinner toward the decorative element in the overlapping region.

2. The decorative component as claimed in claim 1, wherein the minimum material thickness of the display panel in the overlapping region is dimensioned such that merely mechanical damage by way of perpendicular pressure being applied to the panel surface by a human finger is avoided.

3. The decorative component as claimed in claim 1, wherein the display panel and the decorative element are inserted in an installation frame.

4. The decorative component as claimed in claim 1, wherein, on the edge of the overlapping region, the display panel has a panel stop, formed by a jump in the material thickness, for lying areally against a corresponding decorative stop of the decorative element.

5. The decorative component as claimed in claim 1, wherein the display panel is produced from a transparent and/or translucent material, in particular glass, wherein the display panel in the overlapping region has an average translucency which increases toward the decorative element.

6. The decorative component as claimed in claim 5, wherein the translucency of the display panel is at a maximum at that end of the overlapping region which faces toward the decorative element and/or the translucency of the display panel is at a minimum at that end of the overlapping region which faces away from the decorative element.

7. The decorative component as claimed in claim 5, wherein the display panel in the overlapping region has an opaque raster, wherein the raster has longitudinally successive rows with a monotonously changing number of raster points and/or with raster points which monotonously change in size.

8. The decorative component as claimed in claim 1, wherein a longitudinal extent L of the overlapping region corresponds substantially to a longitudinal extent S of the display panel outside the overlapping region, wherein $L/S=1.0\pm0.2$.

9. The decorative component as claimed in claim 1, wherein the display panel is part of a touchscreen.

10. An interior lining for a door of a motor vehicle or central console, comprising:
    a top side which bounds an interior space; and
    a decorative component as claimed in claim 1 that is embedded into the top side.

\* \* \* \* \*